(12) United States Patent  (10) Patent No.: US 9,306,611 B2
Coverstone et al.  (45) Date of Patent: *Apr. 5, 2016

(54) ACTIVE COVER FOR ELECTRONIC DEVICE

(71) Applicant: STAR CO Scientific Technologies Advanced Research Co, LLC, Longview, TX (US)

(72) Inventors: Thomas E. Coverstone, Hallsville, TX (US); Evan J. Thompson, Longview, TX (US)

(73) Assignee: STAR CO SCIENTIFIC TECHNOLOGIES ADVANCED RESEARCH CO, LLC, Longview, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/077,826

(22) Filed: Nov. 12, 2013

(65)  Prior Publication Data

US 2014/0073378 A1  Mar. 13, 2014

Related U.S. Application Data

(63) Continuation of application No. 13/450,458, filed on Apr. 18, 2012, now Pat. No. 8,583,198.

(51) Int. Cl.
| | |
|---|---|
| *H04M 1/00* | (2006.01) |
| *H04B 1/3888* | (2015.01) |
| *H04M 1/725* | (2006.01) |
| *H04M 19/04* | (2006.01) |
| *H04M 1/02* | (2006.01) |
| *H04M 1/22* | (2006.01) |

(52) U.S. Cl.
CPC ......... *H04B 1/3888* (2013.01); *H04M 1/72527* (2013.01); *H04M 19/048* (2013.01); *H04M 1/0283* (2013.01); *H04M 1/22* (2013.01)

(58) Field of Classification Search
CPC . H04M 1/72566; H04M 19/041; H04M 3/02; H04M 2203/2072
USPC .................................. 455/575.8; 379/142.06
See application file for complete search history.

(56)  References Cited

U.S. PATENT DOCUMENTS

| | | | |
|---|---|---|---|
| 7,065,381 B2 | 6/2006 | Jenkins et al. | |
| 7,353,416 B2 | 4/2008 | Jeansonne et al. | |
| 7,400,917 B2* | 7/2008 | Wood et al. | 455/575.8 |
| 7,466,810 B1 | 12/2008 | Quon et al. | |
| 7,769,141 B2* | 8/2010 | Cupal et al. | 379/52 |
| 7,941,725 B2 | 5/2011 | Francillon et al. | |
| 2005/0119032 A1* | 6/2005 | Airas | 455/566 |
| 2006/0240877 A1* | 10/2006 | Filiba et al. | 455/567 |
| 2009/0231248 A1* | 9/2009 | Dorff et al. | 345/83 |
| 2012/0196580 A1* | 8/2012 | Simmons et al. | 455/415 |
| 2012/0302294 A1* | 11/2012 | Hammond et al. | 455/567 |
| 2014/0120883 A1* | 5/2014 | Rondeau et al. | 455/412.2 |

* cited by examiner

*Primary Examiner* — Creighton Smith
(74) *Attorney, Agent, or Firm* — McAnsrews, Held & Malloy, Ltd.

(57)  ABSTRACT

Systems and methods of providing a mobile phone cover are described. In some embodiments, the mobile phone cover may include, for example, a processor and lighting devices. The lighting devices may be operatively coupled to the processor. The processor may be configured, for example, to receive first signals based on second signals in which the second signals are generated by the mobile phone. The second signals may be indicative of an incoming call, an incoming message, a pending message, and/or a calendar alert (e.g., an upcoming appointment), for example. The processor may be configured to cause lighting of one or more of the lighting devices based on the first signals.

21 Claims, 11 Drawing Sheets

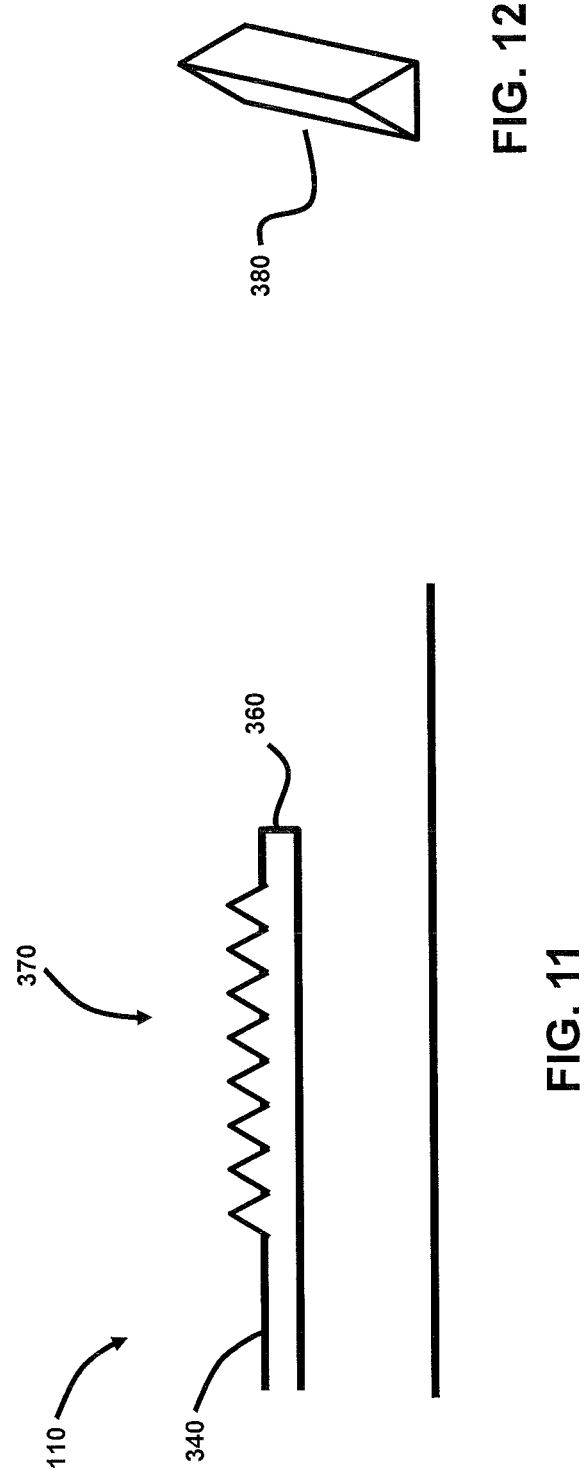

ACTIVE COVER FOR ELECTRONIC DEVICE

CROSS-REFERENCE TO RELATED APPLICATIONS/INCORPORATION BY REFERENCE

The present application is a CONTINUATION of U.S. application Ser. No. 13/450,458, filed Apr. 18, 2012, now issued U.S. Pat. No. 8,583,198. The above-identified application is hereby incorporated herein by reference in its entirety.

FIELD OF THE DISCLOSURE

Some aspects of some embodiments of the present disclosure may relate to, for example, systems and methods for providing an active cover for an electronic device or equipment.

BACKGROUND OF THE DISCLOSURE

Conventional mobile phone covers are passive accessories to mobile phones. They can have static designs and can offer some measure of protection for the mobile phone.

Further limitations and disadvantages of conventional and traditional approaches will become apparent to one of skill in the art through the comparison of such systems with some aspects of some embodiments according to the present disclosure as set forth in the remainder of the present application with reference to the drawings.

BRIEF SUMMARY OF THE DISCLOSURE

Some aspects of some embodiments according to the present disclosure may relate to, for example, an active cover for an electronic device or equipment. In some embodiments according to the present disclosure, the active cover is a mobile phone cover that may include, for example, a processor and lighting devices. The lighting devices may be operatively coupled to the processor. The processor may be configured, for example, to receive first signals based on second signals in which the second signals are generated by a mobile phone. The second signals may be indicative of an incoming call, an incoming message, a pending message, a calendar alert (e.g., an upcoming appointment, an urgent reminder, a less-than-urgent reminder, a periodic reminder, etc.), or other notification, for example. The processor may be configured to cause lighting of one or more of the lighting devices based on the first signals.

These and other advantages, aspects and novel features of the present disclosure, as well as details of an illustrated embodiment thereof, will be more fully understood from the following description and drawings.

BRIEF DESCRIPTION OF THE SEVERAL VIEWS OF THE DRAWINGS

FIG. 11 illustrates a waveguide configuration in accordance with an embodiment of the present disclosure.

FIG. 12 illustrates a microprism or prism as part of a diffuser in accordance with an embodiment of the present disclosure.

DETAILED DESCRIPTION

Some aspects of some embodiments according to the present disclosure may relate, for example, to systems and methods that provide an active cover for an electronic device or equipment.

Some embodiments according to the present disclosure provide that the active cover can sense when the electronic device is generating an alert or an indicator and can provide an enhanced alert or indicator instead of or in addition to the generated alert or indicator of the electronic device.

Some embodiments according to the present disclosure contemplate that the active cover includes a mobile phone cover for use with a mobile phone (e.g., a cellular handset, a cellular device, a wireless phone, a wireless handset, a multimode phone, a mobile phone compliant with multiple wireless communication standards, a mobile phone equipped with global positioning, a multiple-input-multiple-output phone, a wireless communication device, a two-way radio, communication devices with one or more antennas, etc.) The device and methods disclosed can also be used with tablets, tablet computers, and other devices as well.

Some embodiments according to the present disclosure contemplate that, during a mobile phone alert or event, an active mobile phone cover according to the sound or alert data generated by the mobile phone. The device may also illuminate in a distinct or random pattern, for example, according to the sound or alert data generated by the mobile phone. A distinct pattern can be assigned to associated sounds or alerts. For example, a distinct pattern can be assigned to a particular ring tone of the mobile phone. The active mobile phone can enhance the look and feel of the outside of the mobile phone cover, provide the user with superior sensory input over the mobile phone alone, and/or protect the mobile phone from drops, scratches, etc.

Some embodiments according to the present disclosure provide a mobile phone cover with light emitting diodes (LEDs) that are positioned at and/or near the edges and/or sides of a mobile phone. The mobile phone cover can use waveguides, for example, to bring light from the LEDs to illuminate a distinct pattern. The distinct pattern can be facilitated by, for example, diffusers and/or prisms (e.g., microprisms) that are optically coupled to the LEDs, for example, via the waveguides. The diffusers and/or prisms can enhance and/or influence the light generated by the LEDs.

Some embodiments according to the present disclosure provide a mobile phone cover with LEDs that are disposed in one or more bumper bands (e.g., a series of bumper bands) that are disposed, for example, around the mobile phone. The LEDs can facilitate, for example, edge lighting around one or more of the edges of a mobile phone.

Some embodiments according to the present disclosure provide, for example, suitable logic, circuitry, code or combinations thereof that may be adapted to perform the functions or acts described herein.

Figure 1:
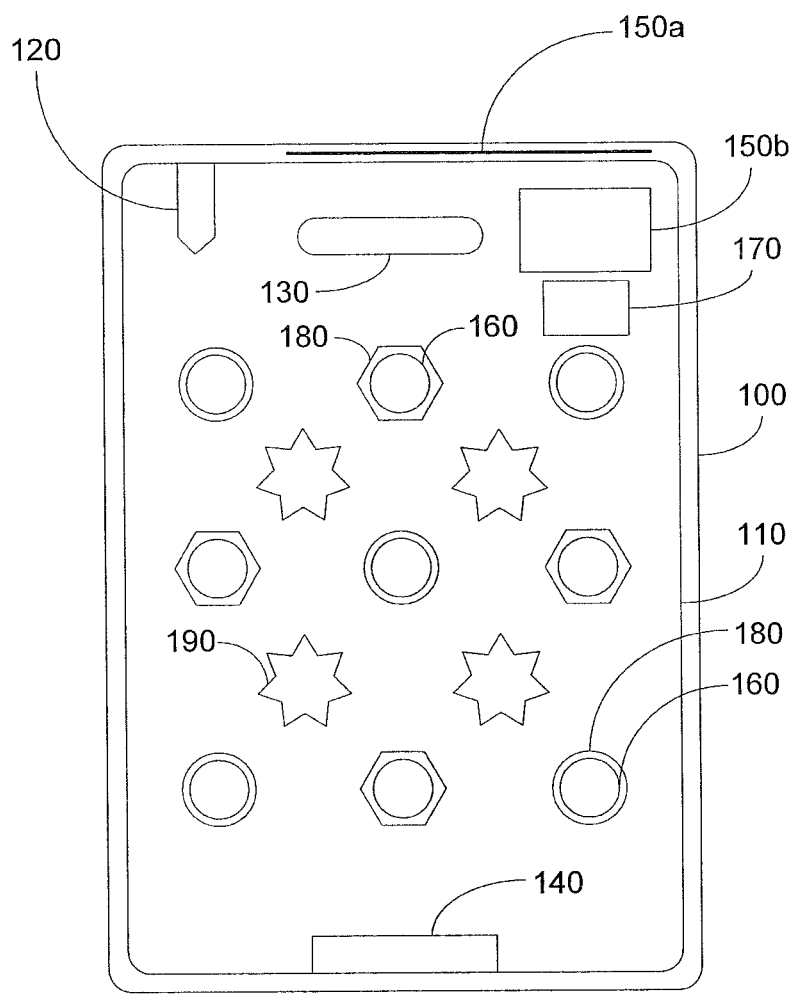
FIG. 1 illustrates a mobile phone cover in accordance with an embodiment of the present disclosure.

FIG. 1 illustrates an embodiment of a mobile phone cover according to some aspects of the present disclosure. A mobile phone cover 100 (e.g., a cover, a case, a shell, a protector, etc.) surrounds a mobile phone 110. In some embodiments according to the present disclosure, the mobile phone 110 may be slipped inside the mobile phone cover 100 and/or the mobile phone cover 100 can be snapped on or stretched around the mobile phone 110. The mobile phone cover 100 can be, for example, an accessory to and/or separate from the mobile phone 110. The mobile phone cover 100 can be adapted, for example, to provide physical vias (e.g., access openings and/or windows) through which various input interfaces and/or output interfaces can be accessed without removing the mobile phone cover 100 from the mobile phone 110. In some embodiments according to the present disclosure, the mobile phone cover 100 may provide a physical opening to access a display, a camera, a button, a control, other output interfaces, and/or other input interfaces of the mobile phone 110. In other embodiments, the mobile phone cover 100 may provide a transparent cover portion, for example, over a display or other portions of the mobile phone 110. The transparent cover portion can be made of materials that, for example, do not interfere with the operation of any of the touch screens of the mobile phone 110. The transparent cover portion may also protect areas of the mobile phone 110 such as touch screens from scratching or other damage.

Some embodiments according to the present disclosure may provide that the mobile phone cover 100 is made of one or more of the following: silicone, rubber, metal, plastic, polymers, composites, cloth, and/or other materials. The cover material may be, at least in part, opaque or transparent. The cover material may assist a user in gripping the mobile phone 110 and/or may protect the mobile phone 110, for example. The cover material may be, for example, shock resistant and/or shatter proof.

Some embodiments according to the present disclosure may provide that the mobile phone 110 include, for example, an audio port 120 (e.g., an audio and/or visual port, an earphone port, a headphone port, etc.), a speaker 130 and a docking port 140 (e.g., a data port, a recharging port, etc.) as illustrated in FIG. 1. Other components and ports of the mobile phone 110 might be not illustrated in the present application, but one of ordinary skill in the art would appreciate the various components and ports that are or can be part of a conventional mobile phone.

The mobile phone cover 100 is illustrated in FIG. 1 to include, for example, circuitry 150 and light emitting diodes (LEDs) 160. The circuitry 150 can be connected, for example, to the LEDs 150.

The mobile phone cover 100 can also include, for example, a battery 170 (e.g., a rechargeable battery, a watch battery, etc.) that can be used to power, for example, the circuitry 150 and/or the LEDs 160. Some embodiments according to the present disclosure provide that the battery 170 can be rechargeable or not rechargeable. If not rechargeable, the battery 170 can be replaced. Some embodiments of the battery 170 include, for example, a lithium battery, an alkaline battery, a silver-oxide battery, etc. If rechargeable, then the battery 170 can be recharged, for example, by drawing energy from the mobile phone 110 through the audio port 120, the docking port 140 and/or some other connection to the mobile phone 110. The battery 170 of the mobile phone cover 100 can be charged by a piezoelectric battery charger, for example. In some embodiments, the piezoelectric battery charger can convert force (e.g., caused by pressure, movements, mechanical forces, etc.) into electrical energy for use by the battery 170. Some embodiments contemplate converting other types of energy (e.g., sound, light, electromagnetic, magnetic, thermal, moving air, etc.) into electrical energy to charge the battery 170. The battery 170 of the mobile phone cover 100 can also be recharged when the mobile phone 110 is connected to a wall outlet, for example, such as when the docking port 140 is connected to a wall outlet. The battery 170 may receive energy directly from the wall outlet (e.g., via connecting the mobile phone cover 100 directly to the wall outlet) or through the mobile phone 110. In addition, the battery 170 may receive energy when the docking port 140 is connected to a computer, for example, and/or when the mobile phone 110 or mobile phone cover 110 is being synchronized. Some embodiments according to the present disclosure contemplate that the circuitry 150 receives power from the mobile phone 110 without using the battery 170. Thus, some embodiments according to the present disclosure might not have a dedicated battery as part of the mobile phone cover 100, or might use the battery 170 as a back-up power source.

The circuitry 150 may be, for example, embedded in the mobile phone cover 100. The circuitry 150 may include, for example, one or more circuit boards 150a including, for example, an integrated circuit. The circuitry 150 may also include, for example, one or more sensors 150b (e.g., an audio sensor, a signal sensor, an optical sensor, a wireless signal sensor, etc.) Components 150a and 150b can be part of the same circuit board or can be part of separate circuit boards, for example. A sensor can be part of components 150a and/or 150b.

Figure 1A:
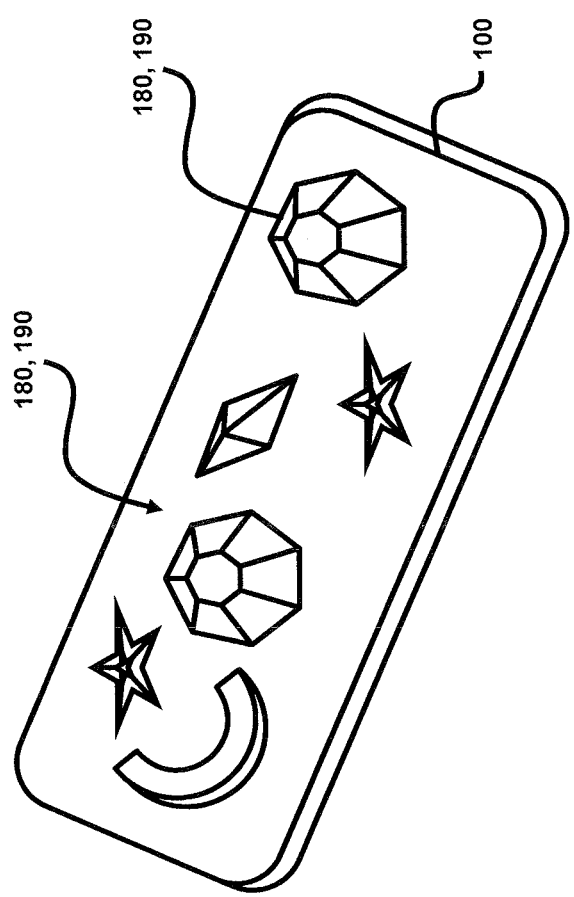
FIG. 1A illustrates a mobile phone cover in accordance with an embodiment of the present disclosure.

Some embodiments according to the present disclosure provide that at least some of the LEDs 160 are covered by at least partially transparent beads 180 (e.g., LED covers). Some embodiments according to the present disclosure provide that the beads 180 extend outwardly and/or inwardly from a surface of the mobile phone cover 100 to provide texture (e.g., a three dimensional texture) and design to the mobile phone cover 100. The beads 180 can be adapted to be or look like, for example, one or more of the following: jewels, crystals, rhinestones, glass, plastic, diamonds, bling, stones, pearls, logos (e.g., school logos, business logos, sports logos, etc.), mascots, artistic shapes, and whimsical shapes. FIG. 1A illustrates an embodiment of the mobile phone cover 100 with different types of beads and/or shapes. The mobile phone cover 100 can include, for example, other beads 190 that may or may not be similar to the beads 180, and that do not cover LEDs 160. The beads 180 and/or the beads 190 may be disposed on the front side, the back side, the inside, the outside, or any side of the mobile phone cover 100 and/or may receive illumination (e.g., scatter illumination) from other beads (e.g., adjacent beads 180 and 190). Adjacent bead lighting may be enhanced by, for example, maintaining a space from the back of the mobile phone 110 to the interior side of the mobile phone cover 100. This may allow stray light, for example, to shine from one bead to another.

Some embodiments according to the present disclosure may provide that the beads 180 and 190 may be made of or made to resemble, for example, one or more of the following: glass, rhinestones, stones, mineral, crystals, diamonds, logos (e.g., school logos, business logos, sports logos, etc.), mascots, artistic shapes, whimsical shapes, silicone, rubber, metals, plastic, polymers, composites, cloth, and/or other materials. The beads 180 and 190 may assist a user in gripping the mobile phone 110 and/or may protect the mobile phone 110, for example. The beads 180 and 190 may be of one or more materials that provide, for example, shock resistance and/or shatter protection. In addition, the beads 180 and 190 may be adapted to enhance the look or design of the mobile phone cover 100.

Figure 2:
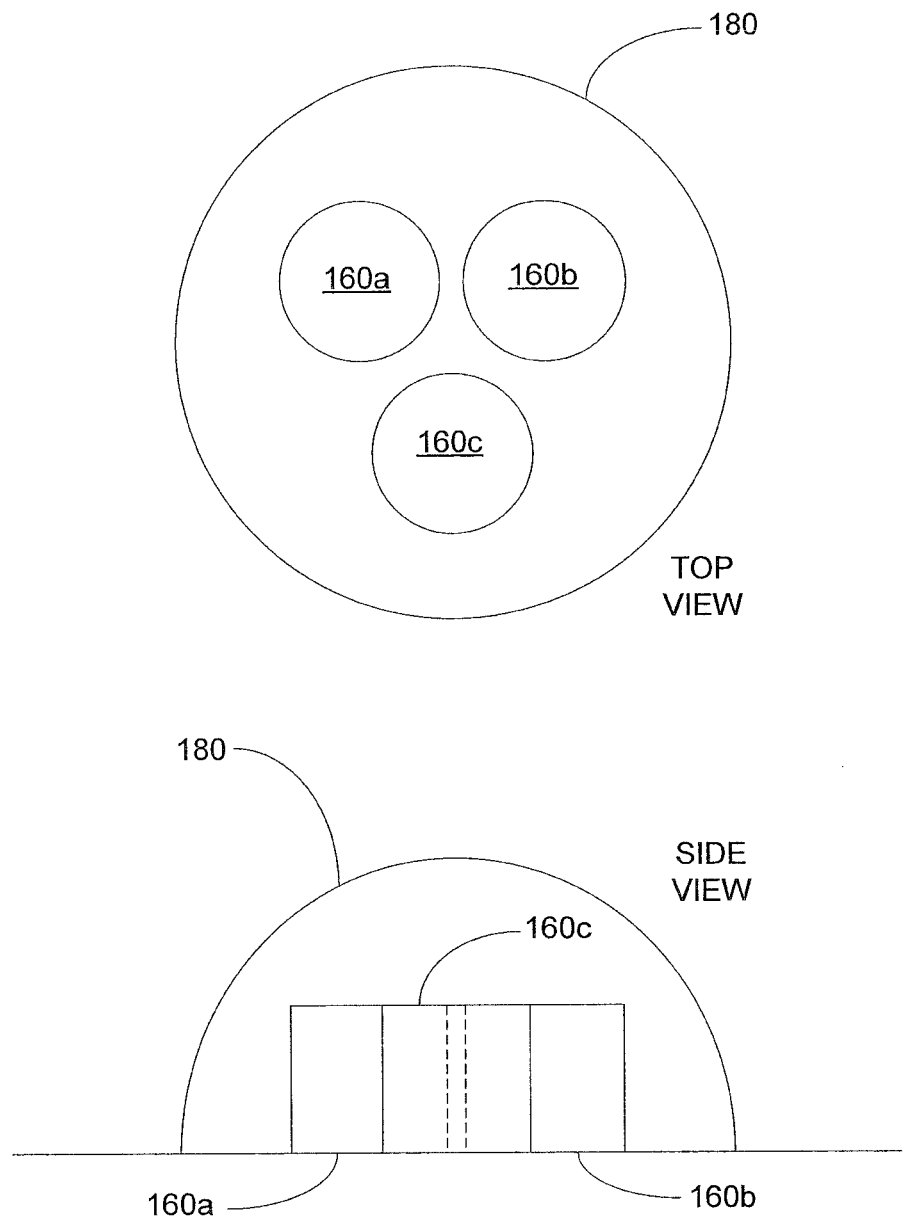
FIG. 2 illustrates three light emitting diodes (LEDs) arrangement in two views in accordance with an embodiment of the present disclosure.

Some embodiments according to the present disclosure provide that the beads 180 and 190 can be colored or uncolored. Some embodiments according to the present disclosure provide that the LEDs 160 provide one or more colors. For example, FIG. 2 illustrates a colored or uncolored bead 180 covering a red LED 160*a*, a green LED 160*b*, and a blue LED 160*c*. Circuitry 150 or other circuitry may be used to drive the red LED 160*a*, the green LED 160*b*, and the blue LED 160*c* to generate any color with any intensity. Some embodiments provide that the beads 180 provide one or more colors when light from one or more LEDs are shown through the one or more colored beads 180, or the one or more colored beads 190 receives light scattered by beads 180 (e.g., adjacent beads).

In operation, some embodiments according to the present disclosure provide that the circuitry 150 enhances indications of a mobile phone alert or event such as, for example, a low battery indication, a roaming indication, an incoming call, a calendar alert, a caller identification, or an incoming/pending message (e.g., text message, video message, voicemail message, missed call message, etc.) by driving the LEDs 150 to light up in a particular manner. For example, when the battery in the mobile phone 110 is getting low, a red bead 180 may become illuminated or may flash on and off at intervals.

Some embodiments according to the present disclosure provide that, when the mobile phone 110 receives an incoming call or message, the mobile phone 110 may generate a particular indicator (e.g., a particular ring, a particular audible indicator, a particular visual indicator, etc.) Some embodiments provide that the circuitry 150 can receive or detect a particular audible indicator from the speaker 130 and/or the audio port 120 (e.g., an earphone/headphone jack) using a sensor in the circuitry 150. Some embodiments provide that the circuitry 150 can receive or detect electrical signals from the audio port 120 and/or the docking port 140 that are indicative of, for example, an incoming call or incoming/pending message.

The circuitry 150 receives or detects the particular indicator and generates a corresponding indicator to enhance the mobile phone's particular indicator. Some embodiments according to the present disclosure provide that the circuitry 150 will light up the LEDs 160 in a particular sequence, pattern, color, and/or intensity based on, for example, the particular indicator that is received or detected from the mobile phone 110. The beads 180 that cover the LEDs 160 can further enhance the indication generated by the mobile phone cover 100 by providing, for example, different shapes and/or colors.

Some embodiments according to the present disclosure contemplate that the mobile phone 110 uses different indicators for different callers, for different types of messages and/or for different senders of messages, for example. The different indicators (e.g., different audio indicators, different electrical signal indicators, etc.) that are received or detected by the circuitry 150 cause the mobile phone cover 100 to generate correspondingly different responses by lighting up the LEDs 160 or the LEDs 160 and the beads 180 in a respective sequence, pattern, color, shape and/or intensity. Thus, for example, an incoming phone call from a first person would cause a first pattern of LEDs 160 to light up on the mobile phone cover 100; an incoming phone call from a second person would cause a second pattern of LEDs 160 to light up on the mobile phone cover 100; an incoming text message from a particular person would cause a third pattern of LEDs 160 to light up depending on the particular person, for example; and an incoming communication from an unknown caller, perhaps indicated by a particular caller or ring tone, for example, would cause a fourth pattern of LEDs 160 to light up. These patterns can be hardwired and/or programmed in the mobile phone cover 100 and/or the mobile phone 110. Some embodiments provide that the mobile phone cover 100 and/or the mobile phone 110 are programmed with the patterns when the mobile phone cover 100 and the mobile phone 110 are connected, or when the mobile phone cover 100 and/or the mobile phone 110 are connected to a computer. Individual patterns or sets of patterns and their correspondence to various events can be set by a user and/or software and/or firmware, or can be set automatically due to default settings stored on the mobile phone cover 100 and/or the mobile phone 100.

Some embodiments according to the present disclosure contemplate that the LEDs 160 or subsets of the LEDs 160 correspond to different frequencies (e.g., different LEDs 160 correspond to different musical notes such as A, B, C sharp, D flat, etc.) and that the ring tone indicative of a particular caller or a particular type of message is played out by the different LEDs 160. The circuitry could also control particular LED intensities and duration, for example, to correspond to different types of musical notes (e.g., quarter note, eighth note, etc.) and different musical dynamics (e.g., loud, soft).

Figure 3:
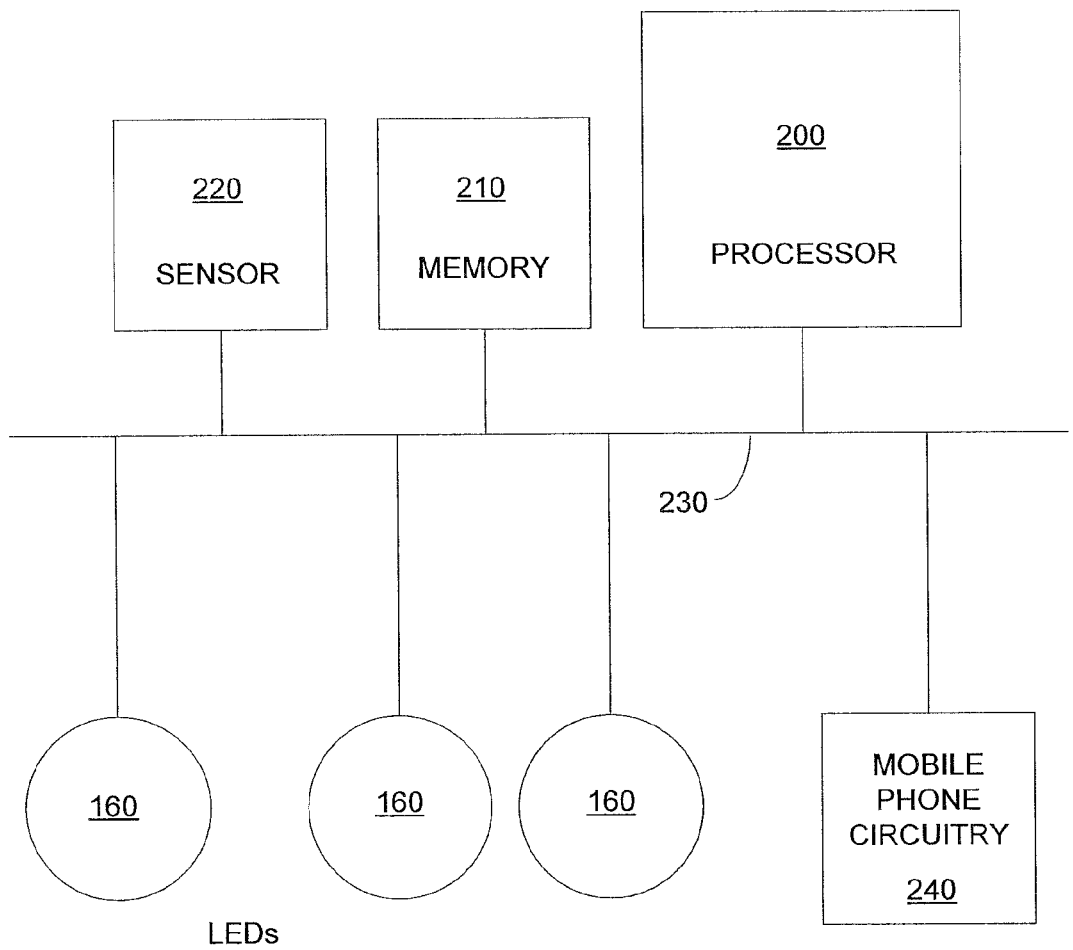
FIG. 3 illustrates a block diagram of circuitry in accordance with an embodiment of the present disclosure.

FIG. 3 illustrates an embodiment of a circuit arrangement according to the present disclosure. The circuitry 150 may include, for example, a processor 200, a memory 210 and/or a sensor 220 as illustrated in FIG. 3. The processor 200, the memory 210 and/or the sensor 220 are connected to a bus 230. The LEDs 160 are also connected to the bus 230. Although illustrated as three LEDs 160, some embodiments according to the present disclosure contemplate using more or less than three LEDs 160. In addition, some embodiments according to the present disclosure contemplate using more or less than one sensor, one processor or one memory.

The processor 200 may include, for example, one or more of the following: a general processor, a central processing unit, a digital filter, a microprocessor, a digital processor, a microcontroller, a programmable array logic device, a complex programmable logic device, a field-programmable gate array and an application specific integrated circuit, and a memory. Code, instructions, software, firmware and/or data may be stored in the processor 200 and/or the memory 210.

The memory 210 may include, for example, one or more of the following: a non-transitory memory, a non-transitory processor readable medium, a non-transitory computer readable medium, a read only memory (ROM), a random access memory (RAM), a cache, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, etc. The memory 210 may be configured to store code, instructions, software, firmware and/or data for use by the processor 200 and may be external and/or internal to the processor 200.

Some of the code, instructions, software, firmware and/or data may be hardwired (e.g., hardware implementations, hardwired into registers, etc.) and/or may be programmable according to some embodiments of the present disclosure. In some embodiments, the ringtones and lighting patterns can be controlled by an interface with the mobile phone 110 and/or the circuitry 150, or can be controlled by software stored on, for example, the mobile phone 110 and/or the memory 210. In some embodiments, the mobile phone 110 and/or the mobile phone cover 100 can be programmed when the mobile phone 110 and/or the mobile phone cover 100 are synched and/or linked with a computing device (e.g., a computer).

In operation in accordance with some embodiments, the mobile phone 110 receives an incoming call or message. The mobile phone 110 may generate a particular audio indicator (e.g., a particular ring tone) that is received by the sensor 220. The sensor 220 senses (e.g., detects and/or processes) the particular ring tone and sends one or more signals to the processor 200 based on the sensed ring tone. The processor 200 determines which of the LEDs 160 to light based on the one or more sent signals. The processor 200 may have its own LED driver circuitry, for example, with which to drive the LEDs 160.

The processor 200 may determine which LEDs 160 to light based on the one or more sent signals by accessing the memory 210. The memory 210 may include, for example, a table or other memory arrangement that stores a correspondence between the one or more sent signals (or one or more values based on the one or more sent signals) and the respective sequences, patterns, colors, and/or intensities of one or more selected LEDs 160. The processor 200 can then execute the respective sequence, patterns, colors, and/or intensities of selected LEDs 160 as set forth in memory 210.

In some embodiments, the one or more sent signals represent one or more musical notes. The memory 210 may include, for example, a table or other memory arrangement that stores a correspondence between the one or more musical notes and the respective sequence, patterns, colors, and/or intensities of one or more selected LEDs 160.

Some embodiments according to the present disclosure contemplate lighting the LEDs 160 and the beads 180 into alphanumeric patterns that convey an indicator (e.g., one or more initials of the caller) or a message.

The table or other memory arrangement can be manually programmed by a user or can be programmed automatically by the processor 200. For example, a user can manually program processor 200 and the memory 210 such that all of the LEDs 160 blink red when a particular caller calls; or the processor 200 can automatically select a preset display of LEDs 160 when a different caller calls or texts.

Some embodiments according to the present disclosure provide that mobile phone circuitry 240 is connected to the bus 230. The connection can be wired via the audio port 120 and/or the docking port 140, or the connection can be wireless from one or more antennas of the mobile phone 110, for example. The mobile phone 110 may generate a signal (e.g., electrical signal, digital signal, analog signal, data signal, wireless signal, etc.) that is an indicator (e.g., a particular ring tone) that is received by either by the sensor 220 or by the processor 200. The processor 200 can include, for example, an analog-to-digital converter. In some embodiments, the signal generated by the mobile phone 110 is received by the processor 200 which then determines in which manner to light one or more selected LEDs 160 to light based on the received signals.

Figure 6:
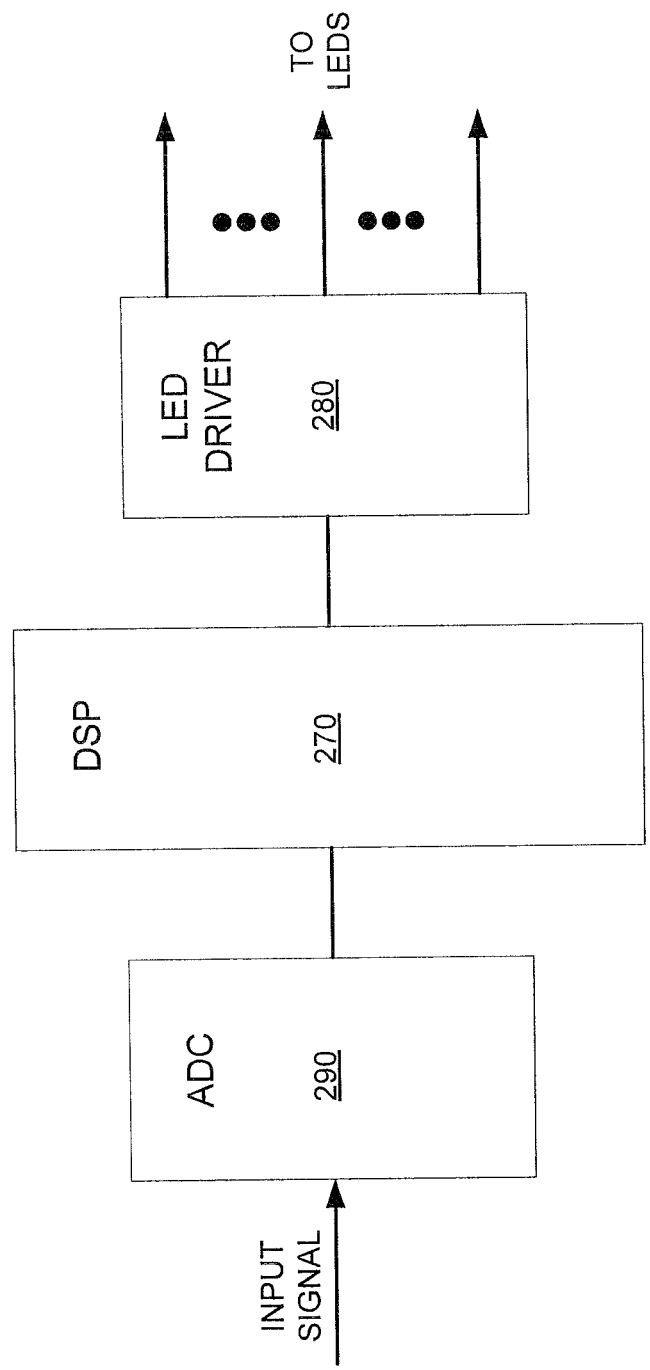
FIG. 6 illustrates a block diagram of circuitry in accordance with an embodiment of the present disclosure.

FIG. 6 illustrates an embodiment according to the present disclosure in which a digital signal processor 270 is used with an analog-to-digital converter 290 and one or more LED drivers 280. Similar in some aspects to FIG. 3, FIG. 6 shows an analog-to-digital converter 290 that converts the analog input signals from the sensor 220 or the mobile phone circuitry 240 to digital input signals. The digital signal processor 270 processes the digital input signals in a similar manner as the processor 200. The digital signal processor 270 then sends out signals to the LED driver 280 which, in turn, drives the LEDs 160. There may be multiple LED drivers 280 for multiple sets of LEDs. For example, one or more LED drivers 280 can drive a set including the red LED 160*a*, the green LED 160*b*, and the blue LED 160*c* as illustrated in FIG. 2.

As with the processor 200, the digital signal processor 270 may include, for example, one or more of the following: a general processor, a central processing unit, a digital filter, a microprocessor, a digital processor, a microcontroller, a programmable array logic device, a complex programmable logic device, a field-programmable gate array and an application specific integrated circuit, and a memory.

Figure 4:
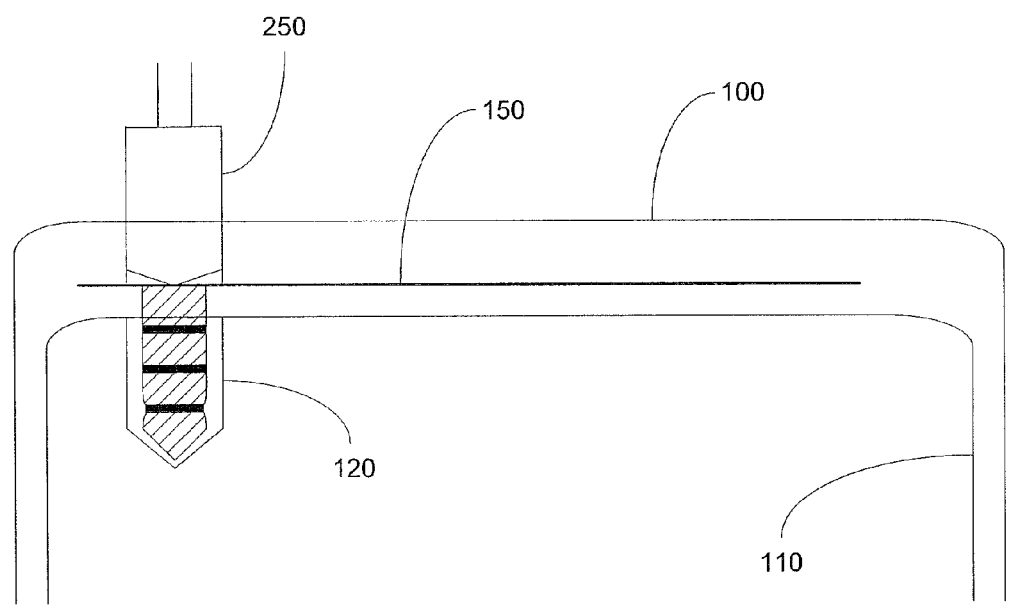
FIG. 4 illustrates an audio port, circuitry and an audio connector in accordance with an embodiment of the present disclosure.

FIG. 4 illustrates an embodiment of a portion of the mobile phone cover 100 according to the present disclosure. The mobile phone cover 100 includes circuitry 150 that may be, for example, embedded, at least in part, in the mobile phone cover 100. Some embodiments according to the present disclosure also contemplate that the circuitry 150 can be partially on the inside or the outside of the mobile phone cover 100. The circuitry 150 includes a circuit board, for example, that is disposed above the audio port 120. The circuit board may include, for example, a physical via through which an audio connector 250 (e.g., an earphone connector, a headphone connector, a speaker connector, a headset connector, etc.) passes to connect to the audio port 120 and the other circuitry of the mobile phone 110. The circuitry 150 is connected to the audio connector 250 and/or the audio port 120.

Some embodiments according to the present disclosure provide that, when the mobile phone 110 receives an incoming call or message, the mobile phone 110 generates an audio signal through the audio port 120 and the audio connector 250. The audio signal may represent, for example, a particular ringtone or other type of audio indicator. The audio signal may be, for example, an electrical signal, a data signal, a digital signal, an analog signal, or an audio output. The circuitry 150 can be connected to the audio port 120 and/or the audio connector 250, and can receive and/or sense the audio signal. As described above, the circuitry 150 then determines the manner in which to light one or more selected LEDs 160 based on the audio signals.

Figure 5:
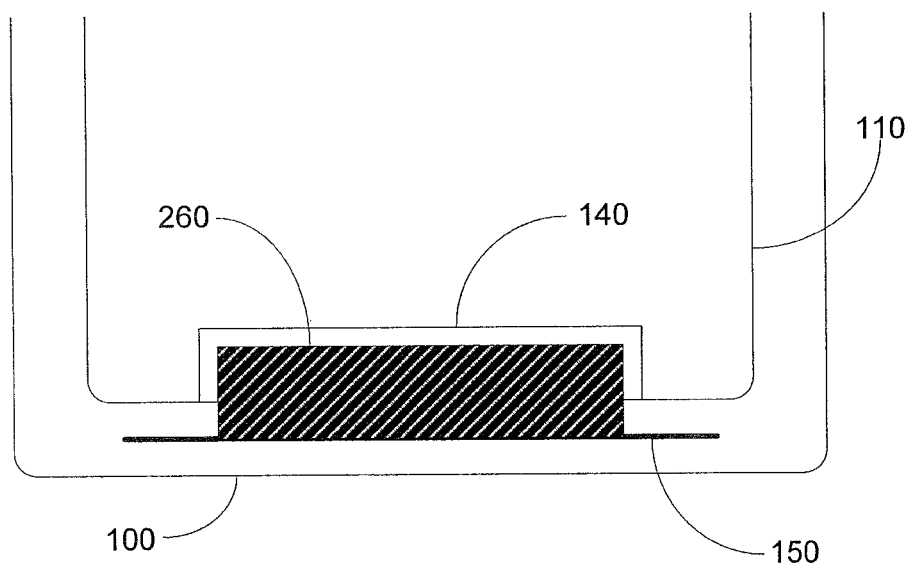
FIG. 5 illustrates a docking port, circuitry and a docking connector in accordance with an embodiment of the present disclosure.

FIG. 5 illustrates an embodiment of a portion of the mobile phone cover 100 according to the present disclosure. The mobile phone cover 100 includes circuitry 150 that may be, for example, embedded, at least in part, in the mobile phone cover 100. Some embodiments according to the present disclosure also contemplate that he circuitry 150 can be partially on the inside or the outside of the mobile phone cover 100. The circuitry 150 illustrated in FIG. 5 may be in addition to or instead of the circuitry illustrated in FIG. 4. The circuitry 150 includes a circuit board, for example, that is disposed under the docking port 140. Some embodiments according to the present disclosure provide for a docking connector 260 extending from the circuit board 150 to the docking port 140. The circuit 150 is connected to the docking port 140 and/or the docking connector 260. The docking connector 260 can be attached to the circuitry 150 or can be part of the circuitry 150. In addition, the docking connector 140 can be part of a docking cable (e.g., a USB cable) that, similar to the audio connector 250 in FIG. 4, passes through a via (e.g., a physical window) in the circuit board of the circuitry 150 to connect to the docking port 140 and the circuitry of the mobile phone 110.

Figure 7:
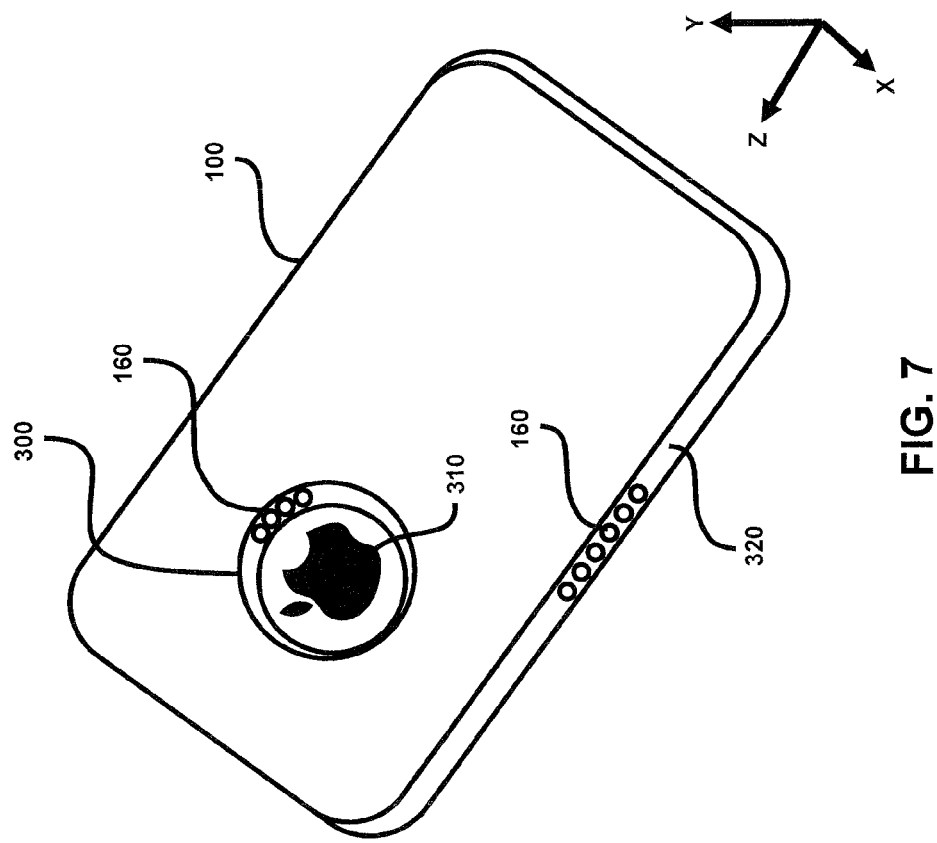
FIG. 7 illustrates a mobile phone cover in accordance with an embodiment of the present disclosure.

FIG. 7 illustrates an embodiment of a mobile phone cover 100 according to the present disclosure. The mobile phone cover 100 can use LEDs 160 for edge lighting and/or signaling. Referring to FIG. 7, the mobile phone cover 100 can be configured with a window 300 that includes LEDs 160 along the edge of the window 300. The window 300 can be a physical opening and/or a transparent portion of the mobile phone cover 100. The window 300 provides visual access to a logo 310 of the mobile phone 110. The logo 310 can be printed or attached to the mobile phone 110 or the mobile phone cover 100. The LEDs 160 are disposed in the edge of the window 300 so that, when the LEDs 160 light up, the logo 310 is illuminated. The LEDs 160 can be lit up according to different patterns, intensities, colors, etc. as is disclosed herein. In some embodiments, the edge lit LEDs 160 can point outward or inward with respect to the mobile phone 110. The edge lit LEDs 160 can be slightly raised above the surface of the mobile phone 110 and can point in a direction along an adjacent surface of the mobile phone 110.

Some embodiments provide that the LEDs 160 can be located along the edge of the mobile phone cover 100 to provide edge illumination. The LEDs 160 can be disposed in a bumper portion (e.g., a bumper band 320) of the mobile phone cover 100. The bumper band 320 can be raised on a back side and/or a front side, for example, so that the LEDs 160 are exposed. The bumper band 320 can be edge lit by the LEDs 160, for example. The number of LEDs 160 illustrated in FIG. 7 is merely exemplary. There can be more or less that the illustrated LEDs 160. For example, the LEDs 160 can be located around the periphery of the bumper band 320, or can be arranged in groups according to different lighting configurations.

In one embodiment, the LEDs 160 illustrated in FIG. 7 can direct lighting substantially in the x-direction. In another embodiment, the LEDs 160 illustrated in FIG. 6 can direct lighting substantially in the y-direction. In yet another embodiment, the LEDs 160 illustrated in FIG. 6 can direct lighting substantially in the z-direction. In some embodiments, the LEDs 160 can direct lighting substantially along the x-, y-, and/or z-direction. The direction of the lighting from the LEDs 160 can be influenced, for example, by the location and direction of the LEDs 160 as well as other influencers such as waveguides, lenses, diffusers, reflectors, prisms, and/or other optical influencers. The LEDs 160 can be lit up according to different patterns, intensities, colors, etc. as is disclosed herein.

Figure 8:
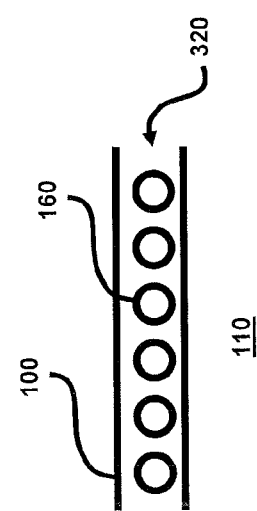
FIG. 8 shows a cross-section of a mobile phone cover with a bumper portion in accordance with an embodiment of the present disclosure.

FIG. 8 shows a cross-section of an embodiment of a mobile phone cover 100 according to the present disclosure. In this configuration, the LEDs 160 can be disposed on the front portion (illustrated) and/or the back portion (not illustrated) of the bumper band 320 disposed along the edge of the mobile phone cover 100. The LEDs 160 can be facing, for example, the y-direction using the direction convention illustrated in FIG. 7. Thus, the LEDs 160 on the front side of the bumper band 320 and the logo 310 would both face the same direction, for example. A similar LED configuration can also be located on the back portion of the same section of the bumper band 320 to illuminate in a different direction. In addition, the lighting of the LEDs 160 and/or the lighting of the bumper band 320 can provide different patterns, intensities, colors, etc. as is disclosed herein.

Figure 9:
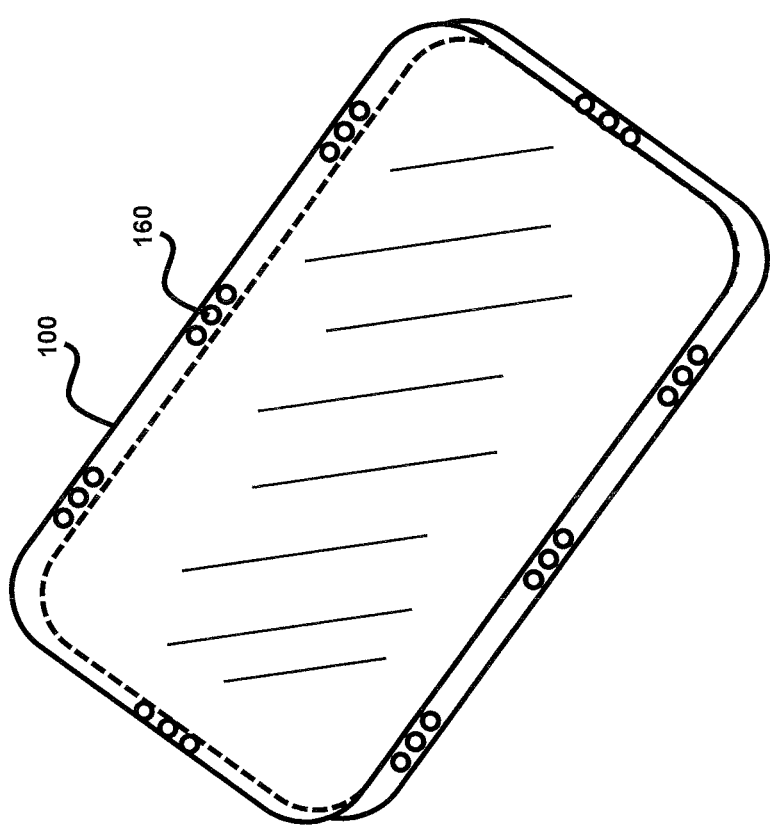
FIG. 9 illustrates a mobile phone cover in accordance with an embodiment of the present disclosure.

FIG. 9 shows an embodiment of a transparent or opaque mobile phone cover 100 with edge-lit LEDs 160 according to the present disclosure. The mobile phone cover 100 can be configured with different waveguides, prisms, reflectors, lenses, diffusers, and/or other optical influencers. In one embodiment, the case (e.g., an opaque case) can act as a diffuser, for example, and the light from one or more of the LEDs 160 when illuminated will be visible throughout the mobile phone cover 100. Some embodiments provide that the illumination of LEDs 160 illuminates the mobile phone cover 100 and/or the edge of a mobile phone cover 100. Some embodiments provide that the illumination of individual LEDs 160 can be seen through a transparent mobile phone cover 100.

Figure 10:
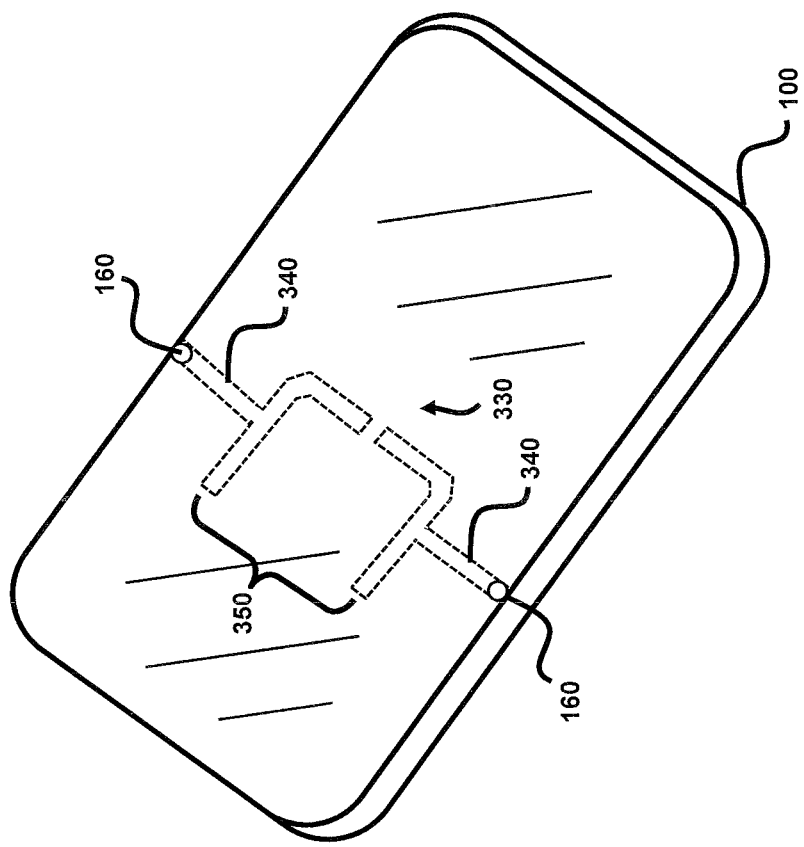
FIG. 10 illustrates a mobile phone cover in accordance with an embodiment of the present disclosure.

FIG. 10 illustrates an embodiment of a mobile phone cover 100 according to the present disclosure. The mobile phone cover 100 has LEDs 160 that are used to illuminate an optical configuration arranged in the shape of a logo 330, for example, a version of a Miami Hurricanes logo of the University of Miami. Referring to FIG. 10, the one or more LEDs 160 are optically coupled to waveguides 340. A portion 350 of the waveguides 340 is also configured in the shape of the logo 330. The waveguides 340 can be configured so that, when the LEDs 160 are lit, the entire wave guide 340 is illuminated from an external point of view. The waveguides 340 can be configured so that, when the LEDs 160 are lit, only the logo portion 350 of the waveguides 340 is illuminated from an external point of view. Except for the logo portion 350, the rest of the waveguides 350 might not be easily visible from an external point of view. In addition, the LEDs 160 can be different colors. For example, the Miami Hurricanes logo is orange on the left side and green on the right side. Some embodiments provide that one or more LEDs 160 can generate the orange or green colors. Some embodiments can employ using colored waveguides or colored prisms to illuminate the logo portion 350 in the appropriate color. Some embodiments provide that a colored logo is printed on the mobile phone 110 or the mobile phone cover 100 and illuminated by the LEDs 160.

Although illustrated with edge-lit LEDs 160, the LEDs 160 can be located next to the logo portion 350 of the waveguides 340. Thus, the LEDs 160 can directly illuminate the logo portion 350. In addition, although illustrated as a logo, the portion 350 of the waveguides 340 that is illuminated need not be limited to logos, but can be any shape, design, or physical structure.

FIG. 11 illustrates an embodiment of a waveguide configuration arranged in a logo according to the present disclosure. The waveguide 340 can end in a termination point 360. The termination point 360 can be, for example, a reflector that keeps the light within the waveguide 340. The termination point 360 can also be an exit point for light. The waveguide configuration can also include a diffuser 370. The illustrated diffuser 370 includes a plurality of microprisms having a triangular shape to diffuse, scatter and/or spread light out to be viewed externally with respect to the mobile phone cover 100. In some embodiments, the diffuser 370 can have, for example, a bumpy or highly modulated surface. The diffuser 370 can, for example, form part of the logo portion 350 of the logo 330 illustrated in FIG. 10. The diffuser 370 can be configured to diffuse, scatter and/or spread the light brought to it by the waveguide 340 to generate an illumination arranged in the form of the logo 330, for example.

FIG. 12 illustrates an embodiment of a prism or microprism of a diffuser according to the present disclosure. The diffuser 370 can include, for example, an arrangement of prisms 380 (e.g., microprisms). The diffuser may comprise, for example, rows and rows of prisms, or a matrix of individual light diffusers in the shape of diamonds or beads.

Some embodiments according to the present disclosure provide that, when the mobile phone 110 receives an incoming call or message, for example, the mobile phone 110 generates a data signal through the docking port 120 and the docking connector 250. The data signal may represent, for example, a particular ringtone, another other type of audio indicator, a visual indicator, caller identification information, message identification information, etc. The data signal may be, for example, an electrical signal (e.g., an analog or a digital signal). The circuitry 150 can be connected to the docking port 140 and/or the docking connector 260, and can receive and/or sense the data signal. As described above, the circuitry 150 then determines the manner in which to light one or more selected LEDs 160 based on the data signals.

Some embodiments according to the present disclosure provide that the mobile phone 110 can be set to silent mode, for example, and that the mobile phone 110 can generate the electrical or wireless signal, for example, that is an indicator of a particular caller or a particular text sender, for example. As described above, the mobile phone cover 100 (e.g., the circuitry 150, the processor 200 and/or the memory 210) can then use the received electrical or wireless signal, for example, to determine in which manner to light one or more selected LEDs 160.

Some embodiments according to the present disclosure provide that the mobile phone 110 can be set to silent mode, for example, and that the mobile phone 110 can generate an optical indicator, for example, that is an indicator of a particular caller or a particular text sender, for example. As described above, the mobile phone cover 100 (e.g., the circuitry 150, the processor 200 and/or the memory 210) can then sense the optical indicator using the sensor 220, for example, to determine in which manner to light one or more selected LEDs 160.

Some embodiments according to the present disclosure contemplate that the mobile phone cover 100 can receive indications from the mobile phone 110 that the mobile phone 110 is receiving an incoming call or message, for example, and then generate audio output, for example, via a speaker that is part of the mobile phone cover 100 and/or not a part of the mobile phone 110.

Some embodiments according to the present disclosure contemplate that the mobile phone cover 100 can receive indications from the mobile phone 110 that the mobile phone 110 is receiving an incoming call or message and then generate a message or other indicator on a display (e.g., LCD screen, LED screen, touch-sensitive screen, etc.) that, for example, is part of the mobile phone cover 100 and/or not a part of the mobile phone 110. In some embodiments according to the present disclosure, the display of the mobile phone cover 100 might be visible on the opposite side as the display of the mobile phone 110.

Some embodiments according to the present disclosure contemplate that the LEDs 160 can selectively light up other structures instead of or in addition to the beads 180. For example, the LEDs 160 can selectively light up lines, strips, rectangular box-like structures, cylindrical-type structures, or waveguide-like structures disposed on or in the mobile phone cover 100. The LEDs 160 can also light up the entire mobile phone cover, one or more entire sides, or one or more portions of entire sides of the mobile phone cover 100 (e.g., at least partially transparent mobile phone cover) in a flashing or pulsating manner, for example.

In summary, some aspects of some embodiments according to the present disclosure may relate to, for example, a mobile phone cover that includes a processor and lighting devices. The lighting devices may be operatively coupled to the processor. The processor may be configured, for example, to receive first signals based on second signals in which the second signals are generated by the mobile phone. The second signals may be indicative an incoming call, an incoming message, a pending message, a calendar alert (e.g., an upcoming appointment), or other notification, for example. The processor may be configured to cause one or more of the lighting devices to light based on the first signals.

Some embodiments according to the present disclosure may be realized in hardware, software, firmware or a combination of hardware, software or firmware. Some embodiments according to the present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Some embodiments according to the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: (a) conversion to another language, code or notation; and (b) reproduction in a different material form.

While some embodiments according to the present disclosure have been described with reference to certain embodiments, it will be understood by those skilled in the art that various changes may be made and equivalents may be substituted without departing from the scope of the present disclosure. In addition, the present disclosure contemplates that aspects and/or elements from different embodiments may be combined into yet other embodiments according to the present disclosure. Moreover, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A mobile phone cover for use with a mobile phone, comprising:
    a processor; and
    lights operatively coupled to the processor,
    wherein the processor is configured to cause the lights to light up based on an identity of a caller to the mobile phone.

2. The mobile phone cover according to claim 1, wherein the processor is configured to receive an output generated by the mobile phone that is used by the processor to identify the caller.

3. The mobile phone cover according to claim 1, wherein the processor is configured to cause the lights of the mobile phone cover to light up in a respective pattern corresponding to the identity of the caller.

4. The mobile phone cover according to claim 1, wherein processor is configured to cause the lights of the mobile phone cover to light up in a respective pattern in time corresponding to the identity of the caller.

5. The mobile phone cover according to claim 1, wherein the processor is configured to receive an output generated by the mobile phone that is used by the processor to light up the lights in a respective pattern as an indication corresponding to one or more of the following: an incoming message, a pending message, and an upcoming appointment.

6. The mobile phone cover according to claim 1, wherein the processor is configured to receive an audio output generated by the mobile phone that is used by the processor to identify the caller or to identify a sender of a message to the mobile phone.

7. The mobile phone cover according to claim 1, wherein the processor is configured to receive an electrical output generated by the mobile phone that is used by the processor to identify the caller or to identify a sender of a message to the mobile phone.

8. The mobile phone cover according to claim 1, wherein the mobile phone generates an audio output or an electric output that is received by the processor to identify the caller.

9. The mobile phone cover according to claim 1, wherein the processor is configured to light the lights in a first manner that corresponds to the identity of a first caller and to light the lights in a second manner that corresponds to the identity of a second caller.

10. The mobile phone cover according to claim 1, comprising:
a sensor operatively coupled to the processor,
wherein the sensor is configured to detect an audio output from a speaker of the mobile phone.

11. The mobile phone cover according to claim 1, wherein the processor is operatively coupled to an audio port or a docking port of the mobile phone, wherein the processor is part of a circuit board or an integrated circuit, wherein the circuit board or the integrated circuit receives signals generated by the mobile phone.

12. The mobile phone cover according to claim 1, wherein the lights include light emitting diodes.

13. The mobile phone cover according to claim 1, wherein outputs of the lights can be combined to generate different colors.

14. The mobile phone cover according to claim 1, comprising first beads that are arranged to cover the lights.

15. The mobile phone cover according to claim 14, comprising second beads that are arranged to not cover the lights.

16. The mobile phone cover according to claim 15, wherein at least some of the first beads or second beads are at least partially transparent.

17. The mobile phone cover according to claim 1, comprising:
one or more batteries operatively coupled to the processor.

18. The mobile phone cover according to claim 17, wherein the mobile phone cover is configured to charge the one or more batteries when the mobile phone is being charged.

19. The mobile phone cover according to claim 1, comprising:
waveguides optically coupled to at least some of the lights; and
diffusers arranged as a logo and optically coupled to the waveguides, wherein the waveguides guide light from the at least some of the lights to the diffusers, and wherein the diffusers scatters light from the waveguide to illuminate the logo.

20. The mobile phone cover according to claim 1, comprising:
a bumper band that is disposed around an edge of the mobile phone cover, wherein the bumper band is optically coupled to at least some of the lights, and wherein the bumper band lights up when the at least some of the lights light up.

21. The mobile phone cover according to claim 1, comprising:
one or more vias configured to provide one or more access openings for an input interface or an output interface.

* * * * *